(No Model.)

J. P. SCHOENI & A. A. LINK.
SAND BAND FOR VEHICLE WHEELS.

No. 251,300. Patented Dec. 20, 1881.

WITNESSES:
Theo. G. Hostn
C. Sedgwick

INVENTOR:
J. P. Schoeni
A. A. Link
BY Munn & Co
ATTORNEYS.

UNITED STATES PATENT OFFICE.

JOHN P. SCHOENI AND ALLEN A. LINK, OF HUBBARDSTON, MICH., ASSIGNORS TO THEMSELVES AND CHARLES S. CRANSON, OF SAME PLACE.

SAND-BAND FOR VEHICLE-WHEELS.

SPECIFICATION forming part of Letters Patent No. 251,300, dated December 20, 1881.

Application filed November 5, 1881. (No model.)

*To all whom it may concern:*

Be it known that we, JOHN P. SCHOENI and ALLEN A. LINK, of Hubbardston, in the county of Ionia and State of Michigan, have invented a new and useful Improvement in Sand-Bands for Vehicle-Wheels, of which the following is a full, clear, and exact description.

The object of our invention is to provide a cheap and efficient sand-guard for the wheels of carriages, wagons, &c.; and it consists of a folded or plicated cup adapted to fit upon the axle, in combination with an overhanging rim or flange to be secured upon the hub of the wheel.

Reference is to be had to the accompanying drawings, forming a part of this specification, in which similar letters of reference indicate corresponding parts in all the figures.

Figure 1:
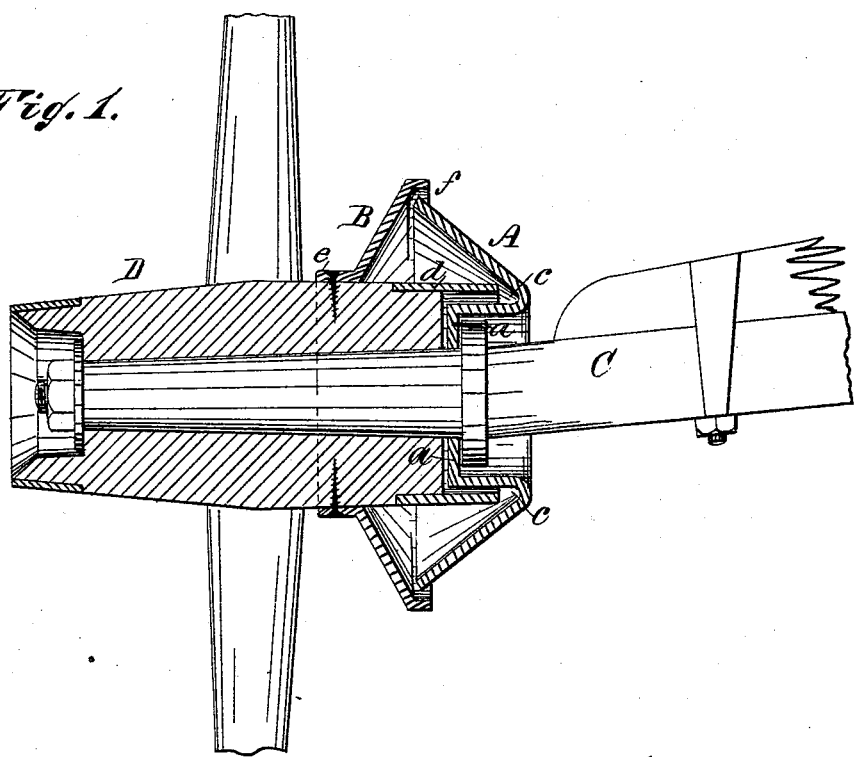
Figure 2:
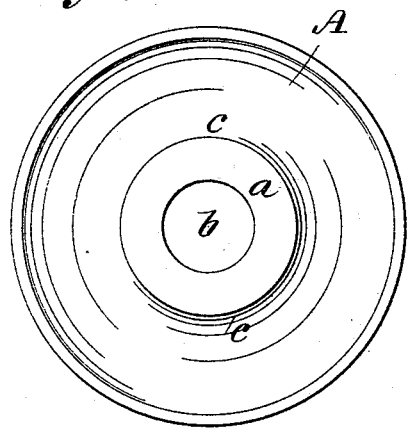
Figure 3:
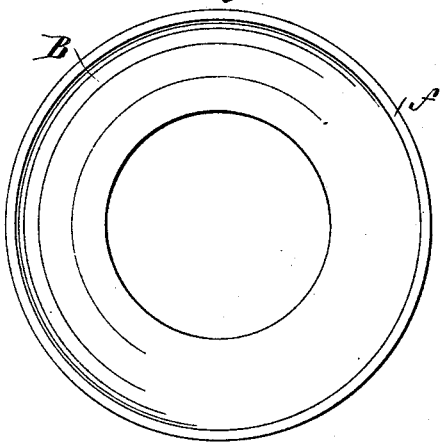

Figure 1 is a sectional elevation of a wheel-hub having our improved sand-guard attached. Fig. 2 is a front elevation of the plicated cup, and Fig. 3 is a front elevation of the overhanging rim or flange.

A represents the cup, which is placed on the axle C, and B represents the rim or flange, which is secured upon the hub D, as clearly shown in Fig. 1. The cup and flange are preferably stamped into shape from tin or sheet-iron; or any other sheet metal may be used. The cup is formed with the central annular head, $a$, which is formed with the round central opening, $b$, for the passage of the axle. From the head $a$ the metal of the cup is bent backward at right angles to the head, and then it is folded diagonally upward and forward to form the chamber $c$, which incloses the rim $d$ of the hub. The flange B is formed with the collar $e$, through which the screws or other fastenings pass for securing the same upon the hub, and it is also formed with the horizontal lip $f$, which, when the flange is in place, overhangs the upper edge of the cup and prevents all sand, dust, or dirt reaching the chamber inclosed by the flange and cup, and from reaching the axle.

Thus constructed and applied the parts in no manner interfere with the removal and replacing of the wheel, and they can be placed upon any axle and hub, and they make a cheap and effectual sand-guard for the axle.

Having thus described our invention, we claim as new and desire to secure by Letters Patent—

The cup A, folded to form the chamber $c$, and adapted to be placed upon the axle, in combination with the guard or rim B, formed with the lip $f$, and adapted to be secured upon the hub, substantially as and for the purposes described.

JOHN P. SCHOENI.
ALLEN A. LINK.

Witnesses:
A. V. PHISTER,
WM. H. ELLIS.